United States Patent [19]

Sautter et al.

[11] Patent Number: 4,671,531
[45] Date of Patent: Jun. 9, 1987

[54] REAR WHEEL SUSPENSION FOR MOTOR VEHICLES

[75] Inventors: Wolfgang Sautter, Graefelfing; Ludwig Strasser, Ebersberg; Rudolf Mueller, Dachau, all of Fed. Rep. of Germany

[73] Assignee: Bayerische Motoren Werke AG, Fed. Rep. of Germany

[21] Appl. No.: 832,765

[22] Filed: Feb. 25, 1986

[30] Foreign Application Priority Data

Feb. 28, 1985 [DE] Fed. Rep. of Germany ....... 3507081

[51] Int. Cl.$^4$ ............................ B60G 3/00; B60G 3/20
[52] U.S. Cl. .................................... 280/690; 280/688; 280/701
[58] Field of Search ............... 280/688, 689, 690, 701, 280/705

[56] References Cited

U.S. PATENT DOCUMENTS 4,515,391 5/1985 Koide .................................. 280/690
4,542,920 9/1985 Kijima et al. ....................... 280/701

FOREIGN PATENT DOCUMENTS 2038880 2/1972 Fed. Rep. of Germany .
3131247 3/1975 Fed. Rep. of Germany .

Primary Examiner—Richard A. Bertsch
Attorney, Agent, or Firm—Barnes & Thornburg

[57] ABSTRACT

A rear wheel suspension for motor vehicles with a wheel carrier supporting the wheel, with a longitudinal arm extending approximately in the vehicle longitudinal direction and connected with the wheel carrier and the vehicle body and with at least two cross guide members connected with the wheel carrier which are arranged one behind the other in plan view. Whereas the longitudinal arm is elastically connected directly with the vehicle body, the two cross guide members are pivotally connected at their ends on the body side at an auxiliary frame which in its turn is elastically connected with the vehicle body by way of rubber bushings. Unilaterally acting longitudinal forces can be absorbed elastically in the bearing without causing a significant rotation of the auxiliary frame about a vertical axis which would lead to undesired steering movements of the two wheels of an axle.

20 Claims, 5 Drawing Figures

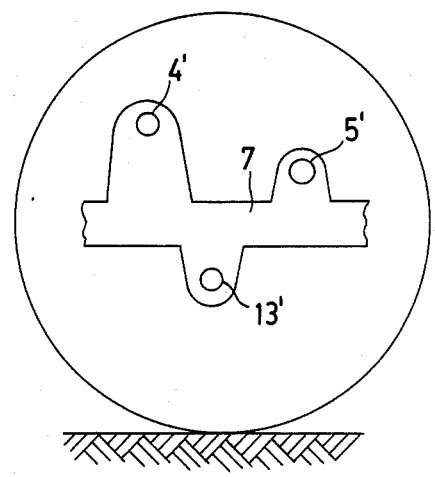
FIG.IA

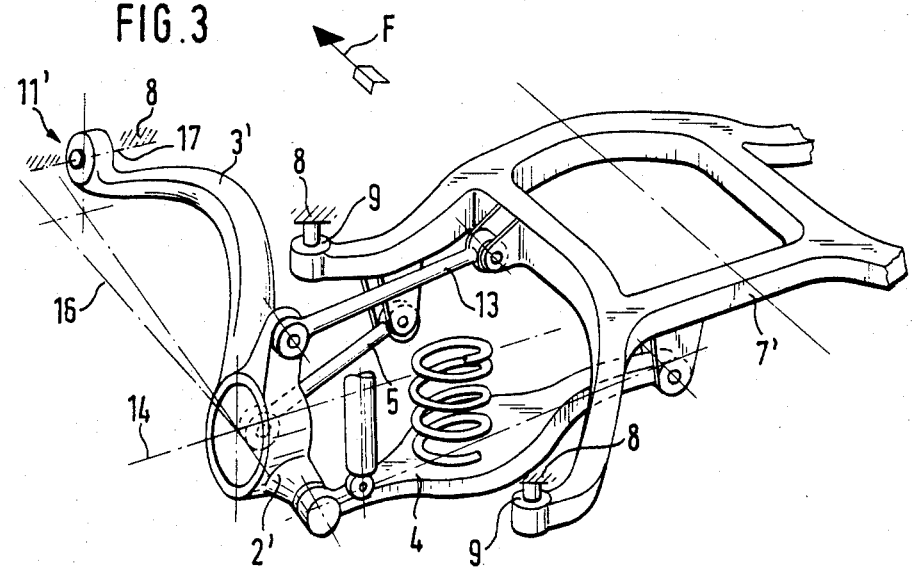
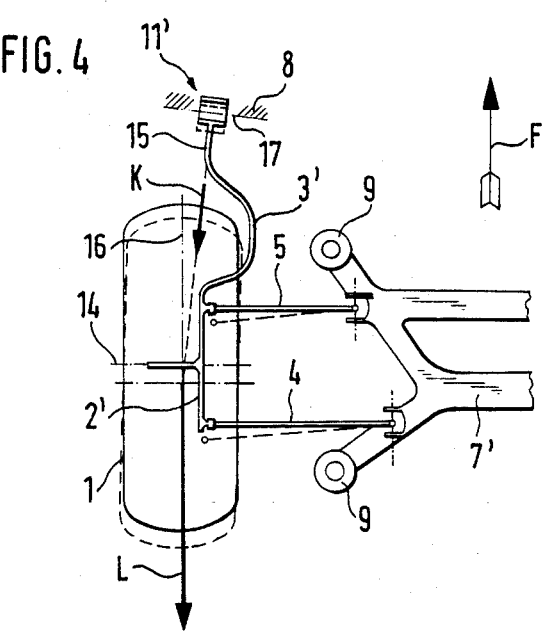

REAR WHEEL SUSPENSION FOR MOTOR VEHICLES

The present invention relates to a rear wheel suspension for motor vehicles as described, for example, in DE-OS No. 20 38 880, in which the wheel is supported on a wheel carrier and which includes a longitudinal arm extending approximately in the vehicle longitudinal direction which is connected with the wheel carrier and with the vehicle body, and two cross guide members arranged one behind the other as viewed in plan view which are operatively connected with the wheel carrier and the vehicle body.

With such wheel suspensions, the ends on the body side of all guide members are pivotally connected directly at the vehicle body so that such wheel suspensions are not satisfactory, especially by reason of the high noise transmission into the vehicle body.

A number of axles of different type have therefore been disclosed in which all of the guide members coordinated to the wheel carrier of a wheel are pivotally connected at an auxiliary frame on the body side which in its turn is again elastically supported at the vehicle body. The roll-off noises of the tire, noises stemming from the joint shafts and possibly also noises caused by the rear axle gear can be kept satisfactorily from the vehicle body in this manner so that a good comfort is attainable as regards the noise behavior. However, a considerable disadvantage of such wheel suspensions having an auxiliary frame resides in that unilateral longitudinal forces exert on the auxiliary frame a torque about a vertical axis which by reason of the elastic connection of the auxiliary frame with the vehicle body leads to a rotation of the auxiliary frame about this vertical axis. Undesired steering movements result therefrom both on the part of the wheel which is subjected to the longitudinal force, as also on the part of the other wheel of this axle which is also connected with all of its guide members only at the auxiliary frame.

The present invention is therefore concerned with the task to provide a rear wheel suspension of the aforementioned type which, on the one hand, permits a good noise insulation to the vehicle body and, on the other, especially with longitudinal forces acting on only one wheel of an axle, avoids undesirable steering movements of this wheel and/or of the other wheel of an axle.

The underlying problems are solved according to the present invention in a wheel suspension of the aforementioned type in that the cross guide members are pivotally connected with their ends on the body side at an auxiliary frame which is elastically connected with the vehicle body whereas the longitudinal arm is pivotally connected directly at the vehicle body.

Owing to these measures, longitudinal forces are introduced into the vehicle body from the wheel carrier far-reachingly alone by way of the longitudinal arm. The pivotal connection of the longitudinal arm on the body side can be selected relatively soft in the vehicle longitudinal direction. Longitudinal shocks or impacts on the wheel are therefore well-damped so that the noises resulting therefrom are now transmitted strongly reduced into the vehicle body. Additionally, as a rule, the structure of the vehicle body is constructed very sturdily at this place. Unilaterally acting longitudinal forces cause in the cross guide members extending transversely to the driving direction forces barely worth mentioning, above all, oppositely directed forces. They are merely pivoted parallelogram-like in case of a longitudinal displacement of the wheel carrier (within the scope of the elasticity of the bearing of the longitudinal arm on the body side). No steering movement is thereby exerted on the wheel. As also the auxiliary frame is at most exposed to slight additional lateral forces in case of longitudinal forces, the auxiliary frame does not carry out any rotary movements notwithstanding its elastic connection with the vehicle body so that also no undesired steering movements can result therefrom. Nonetheless, the cross guide members can be so positioned relative to the wheel carrier—for example, by a certain sweep-back in plan view or by a certain matching of their lengths—that desired small steering movements in the direction of toe-in or toe-out are attainable with longitudinal and lateral forces. These slight steering movements, however, are easily controllable and are not superimposed by undesirable large additional steering movements.

These and other objects, features and advantages of the present invention will become more apparent from the following description when taken in connection with the accompanying drawing which shows, for purposes of illustration only, two embodiments in accordance with the present invention, and wherein:

FIG. 1(A) is a variation of the schematic side elevation of FIG. 1 wherein the main guide members are connected below the wheel axis;

FIG. 3 is a perspective view of a further embodiment of a rear wheel suspension in accordance with the present invention; and FIG. 4 is a schematic partial plan view on the wheel suspension according to FIG. 3.

Figure 1:
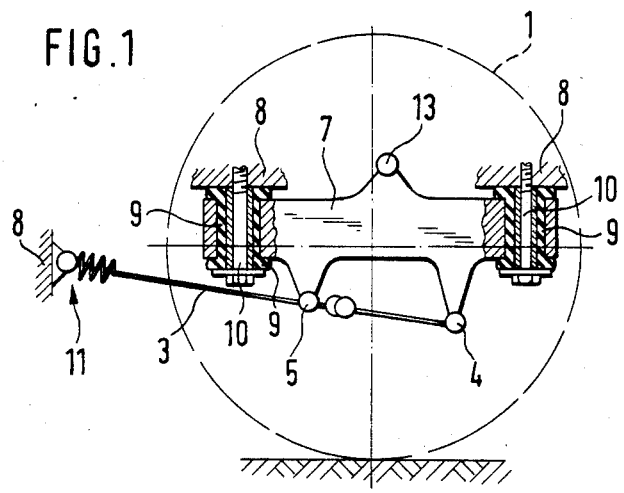
FIG. 1 is a schematic side elevational view of a first embodiment of a rear wheel suspension in accordance with the present invention.
Figure 2:
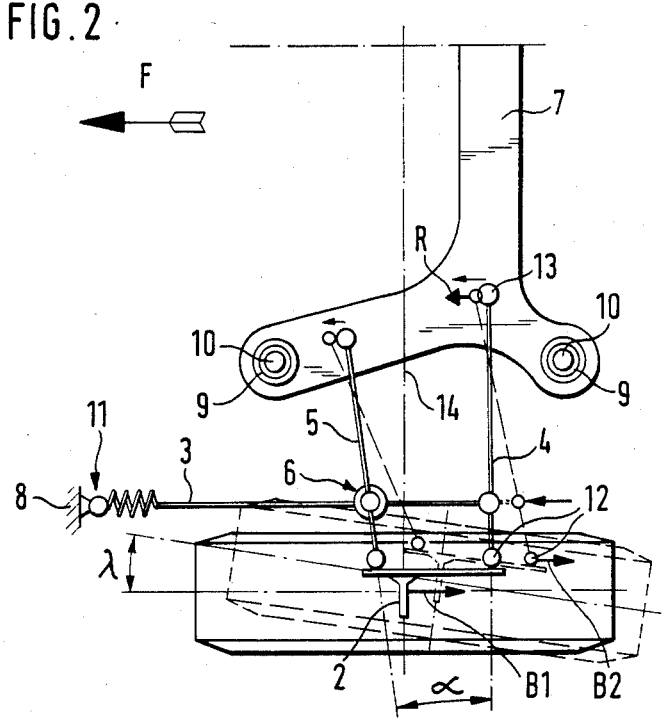
FIG. 2 is a schematic plan on the rear wheel suspension according to FIG. 1.

Referring now to the drawing wherein like reference numerals are used throughout the various views to designate like parts, in the rear wheel suspension according to FIGS. 1 and 2, the wheel is designated by reference numeral 1 which is supported on a wheel carrier 2 (FIG. 2) merely schematically indicated. In this embodiment, the longitudinal arm 3 is not pivotally connected directly with the wheel carrier 2 but indirectly in such a manner that this longitudinal arm 3 engages pivotally at the rear cross guide member 4 which, in its turn, is pivotally connected with the wheel carrier 2. Additionally, a further cross guide member 5 which is located ahead of the cross guide member 4 as viewed in plan view, engages at the wheel carrier 2. The forward cross guide member 5 is coupled in this embodiment with the longitudinal arm 3 by way of a special connecting bearing 6 which permits approximately horizontal relative movements between the cross guide member 5 and the longitudinal arm 3 while supporting the cross guide member 5 and the longitudinal arm 3 with respect to one another in an approximately vertical direction. In this manner, an ideal higher and more remote point of pivotal connection for the longitudinal arm can be achieved which, however, will not be explained in detail herein in conjunction with the present invention.

As can be seen in particular from FIG. 2, the cross guide members 4 and 5 are pivotally connected at their ends on the body side at an auxiliary frame 7 which is elastically connected with the vehicle body 8. The longitudinal arm 3, in contrast, is elastically pivotally connected directly at the vehicle body 8. The auxiliary frame 7 is elastically connected with the vehicle body 8 by way of rubber bushes 9 in a conventional manner. The fastening bolts 10 which extend through the rubber bushings 9 are arranged vertically in the illustrated embodiment. However, they could also be inclined and therewith also fix the rubber bushings 9 inclined in any desired direction in order to predetermine an intentional and desired displacement to the auxiliary frame 7 in case of occurring forces. The indicated spring at the bearing 11 of the longitudinal arm 3 on the body side is intended to indicate that this bearing is relatively yielding in the vehicle longitudinal direction F. Longitudinal shocks or impacts which act on the wheel are introduced into the vehicle body 8 by the longitudinal arm 3 by way of the bearing 11 which is relatively soft in the longitudinal direction, without the transmission to the body of noises impairing the comfort. Since the longitudinal forces are predominantly absorbed by the longitudinal arm 3, only smaller forces are transmitted onto the cross guide members 4 and 5 which influence the auxiliary frame 7 that is elastically connected with the vehicle body 8, in its desired position only slightly and barely rotate the same.

The two joints of the two cross guide members 4 and 5 on the side of the wheel carrier have a smaller longitudinal spacing from one another as viewed in plan view than the two joints of these cross guide members provided at the auxiliary frame 7. The cross guide members are inclined to one another under the so-called sweep-back angle α.

If nonetheless steering movements of the wheel 1 and small displacement movements of the auxiliary frame 7 are explained hereinafter by reference to the embodiment illustrated in particular in FIG. 2—which are illustrated exaggerated for purposes of better understanding—, it should be understood that they involve completely intended and desired steering movements, respectively, displacements.

During the occurrence of a braking force B1, the wheel 1 can deflect by a certain distance toward the rear. Inter alia also by reason of the sweep-back angle α which produces an instantaneous center of rotation located far outside of the wheel, the wheel carrier 2 and therewith the wheel 1 will rotate about the desired toe-in angle λ in the manner illustrated in the drawing—where for purposes of better understanding it is illustrated exaggerated in dash lines. The brake force B1 is initially transmitted in an at least approximately equal magnitude as force B2 onto the outer joint 12 of the rear cross guide member 4 and produces at the inner joint 13 thereof a reaction force R. This reaction force again displaces the auxiliary frame 7 somewhat forwardly—within a desired extent—which additionally assists the desired movement of the wheel into toe-in. If in lieu of braking forces driving forces are exerted on the wheel suspension, then the displacement of the wheel 1, respectively, of the auxiliary frame, takes place in the reverse direction.

As can be seen, thanks to the direct elastic pivotal connection of the longitudinal arm 3 at the vehicle body 8 in conjunction with the pivotal connection of the two cross guide members 4 and 5 at the auxiliary frame 7, in its turn elastically connected with the vehicle body, the aforementioned undesired steering movements of the auxiliary frame 7 can be eliminated while, on the other, completely intentional elastokinematic displacements of the auxiliary frame 7 and therewith also of the wheel can be predetermined in each case in the correct sense.

The joint 11 at the end of the longitudinal arm 3 on the body side may be a rubber joint yielding in the longitudinal direction. Furthermore, FIG. 1(A) shows the two cross guide members 4' and 5' may be pivotally connected in the upper area of the wheel carrier and a third cross guide member 13 in the lower area thereof.

In the embodiments illustrated in the drawing, the two cross guide members 4 and 5 are pivotally connected in the lower area of the wheel carrier 2 and a third cross guide member 13 is pivotally connected in the upper area thereof.

In the embodiment illustrated in FIGS. 3 and 4, the longitudinal arm 3' and the wheel carrier 2' pass over into one another in one piece. The bearing 11' of the longitudinal arm 3' on the body side must then be yielding not only in the longitudinal direction but must also permit a transverse displacement of the end of the longitudinal arm 3' on the body side. However, this bearing 11' should be constructed relatively hard in the approximately vertical direction.

It is particularly favorable if—as can be seen from FIGS. 2 and 4—the cross guide members 4 and 5 are arranged approximately at the same distances in front and to the rear of the wheel axis 14 as viewed in plan view. Transverse forces acting on the wheel are then distributed approximately uniformly onto the two cross guide members 4 and 5 and the auxiliary frame 7, respectively, 7' so that this auxiliary frame carries out far-reachingly only translatory cross movements. Larger toe-in changes do not occur thereby, but at most again only smaller ones in a defined and desired direction.

In the embodiment according to FIGS. 3 and 4, the end 15 of the longitudinal arm 3' on the body side is bent off in the direction toward the wheel center plane 16 so that the bearing 11' provided at this end 15 is located at least approximately in the wheel center plane 16. In this manner, longitudinal forces engaging at the wheel 1 produce nearly no moment on the longitudinal arm 3' about a vertical axis. They are therefore absorbed nearly exclusively by the longitudinal arm 3' and introduced into the vehicle body 8 exclusively by way of the bearing 11'.

If the bearing 11' is slightly displaced or offset from the wheel center plane toward the inside, then the axis 17, along which the end 15 of the longitudinal arm 3' on the body side is able to displace itself transversely, is appropriately so inclined against a cross plane, as viewed in plan view, that the reaction force K resulting at the longitudinal arm 3' during occurring longitudinal forces intersects with the longitudinal force L between the axes of the two cross guide members 4 and 5 (FIG. 4). Thanks to these measures, approximately equal transverse forces are exerted on the two cross guide members 4 and 5 and it will lead barely to rotations of the auxiliary frame 7' about a vertical axis.

The bearing 11' of the longitudinal arm 3' on the body side can be formed by a rubber-elastic bearing soft in the transverse displacement direction. However, it would also be possible to realize this bearing by a rubber-elastic bearing which is displaceable in the transverse displacement direction in a slide guidance.

While we have shown and described only two embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A rear wheel suspension for motor vehicles, especially for driven rear wheels, comprising wheel carrier means supporting thereon a wheel, longitudinal arm means extending approximately in the vehicle longitudinal direction and operatively connected near one end thereof with the wheel carrier means and at the other end thereof with a relatively fixed vehicle part, two cross guide means, and auxiliary frame means elastically connected with the relatively fixed vehicle part, the two cross guide means being operatively connected at one end thereof with the wheel carrier means and being pivotally connected at the other end thereof at said auxiliary frame means, and the longitudinal arm means being pivotally connected directly and yielding in the longitudinal direction at said relatively fixed part with its other end.

2. A rear wheel suspension according to claim 1, wherein said relatively fixed part is a part of the vehicle body.

3. A rear wheel suspension according to claim 1, wherein the pivotal connection of the longitudinal arm means at the other end thereof includes a rubber joint means.

4. A rear wheel suspension according to claim 1, wherein the two cross guide means are pivotally connected within the upper area of the wheel carrier means and a third cross guide means is pivotally connected at the lower area thereof.

5. A rear wheel suspension according to claim 1, wherein the two cross guide means are pivotally connected in the lower area of the wheel carrier means and a third cross guide means is pivotally connected at the upper area thereof.

6. A rear wheel suspension according to claim 1, wherein the cross guide means are arranged approximately at the same distance in front and to the rear of the wheel axis as viewed in plan view.

7. A rear wheel suspension according to claim 1, wherein the longitudinal arm means and the wheel carrier means pass over into one another in one piece.

8. A rear wheel suspension according to claim 8, wherein the joint means at the other end of the longitudinal arm means permits a transverse displacement of said end.

9. A rear wheel suspension according to claim 8, wherein the other end of the longitudinal arm means is bent toward the wheel center plane and the joint means provided at said end is located approximately in the wheel center plane.

10. A rear wheel suspension according to claim 8, wherein the axis along which the joint means of the longitudinal arm means at its other end is able to displace itself is so inclined in plan view against a cross plane that the reaction force resulting during the occurring longitudinal forces at the longitudinal arm means intersects with the longitudinal force between the axes of the two cross guide means and in the longitudinal direction intermediate elastic bearing means of the auxiliary frame means.

11. A rear wheel suspension according to claim 8, wherein the bearing means of the longitudinal arm means at the other end is formed by a rubber-elastic bearing soft in the transverse displacement direction.

12. A rear wheel suspension according to claim 8, wherein the bearing means of the longitudinal arm means at the other end is formed by a rubber-elastic bearing which is displaceable in the transverse displacement direction within a slide guide means.

13. A rear wheel suspension according to claim 1, wherein the two joint means of the two cross guide means on the side of the wheel carrier means have a smaller spacing from one another as viewed in plan view than the two joint means provided at the auxiliary frame means.

14. A rear wheel suspension according to claim 13, wherein the cross guide means are arranged approximately at the same distance in front and to the rear of the wheel axis as viewed in plan view.

15. A rear wheel suspension according to claim 14, wherein the pivotal connection of the longitudinal arm means at the other end thereof includes a rubber joint means yielding in the longitudinal direction.

16. A rear wheel suspension according to claim 14, wherein the two cross guide means are pivotally connected within the upper area of the wheel carrier means and a third cross guide means is pivotally connected at the lower area thereof.

17. A rear wheel suspension according to claim 14, wherein the two cross guide means are pivotally connected in the lower area of the wheel carrier means and a third cross guide means is pivotally connected at the upper area thereof.

18. A rear wheel suspension according to claim 14, wherein the two joint means of the two cross guide means on the side of the wheel carrier means have a smaller spacing from one another as viewed in plan view than the two joint means provided at the auxiliary frame means.

19. A rear wheel suspension according to claim 18, wherein the longitudinal arm means and the wheel carrier means pass over into one another in one piece.

20. A rear wheel suspension according to claim 19, wherein the joint means at the other end of the longitudinal arm means permits a transverse displacement of said end.

* * * * *